US008717595B2

(12) United States Patent
Takamoto et al.

(10) Patent No.: US 8,717,595 B2
(45) Date of Patent: May 6, 2014

(54) PRINT CONTROLLER HAVING A FILTER DRIVER INSTALLED IN AN OPERATING SYSTEM LAYER AND A DATA OUTPUTTING APPLICATION INSTALLED IN AN APPLICATION LAYER

(75) Inventors: Akio Takamoto, Matsumoto (JP); Takashi Yamada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 978 days.

(21) Appl. No.: 12/383,340

(22) Filed: Mar. 23, 2009

(65) Prior Publication Data

US 2009/0237717 A1   Sep. 24, 2009

(30) Foreign Application Priority Data

Mar. 21, 2008  (JP) ................. 2008-073406

(51) Int. Cl.
*G06K 15/00*   (2006.01)
*G06F 3/12*    (2006.01)

(52) U.S. Cl.
USPC ........................ 358/1.15; 358/1.14

(58) Field of Classification Search
CPC ..... G06F 3/1207; G06F 3/121; G06F 3/1229; G06F 3/1259; G06F 3/1294
USPC ................................ 358/1.14, 1.15
See application file for complete search history.

(56) References Cited

U.S. PATENT DOCUMENTS

| 2006/0268304 A1* | 11/2006 | Tanaka et al. ............ 358/1.13 |
| 2007/0103716 A1* | 5/2007 | Shiraiwa et al. .......... 358/1.14 |
| 2009/0199217 A1* | 8/2009 | McBrearty et al. ........ 719/327 |

FOREIGN PATENT DOCUMENTS

| JP | 07-296070 | 11/1995 |
| JP | 2000-238388 | 9/2000 |
| JP | 2000-242443 A | 9/2000 |
| JP | 2002-092439 | 3/2002 |
| JP | 2002-092745 | 3/2002 |
| JP | 2003-260819 | 9/2003 |
| JP | 2004-001519 | 1/2004 |
| JP | 2004-127150 A | 4/2004 |
| JP | 2005-153218 A | 6/2005 |
| JP | 2005-222423 A | 8/2005 |
| JP | 2005-321873 A | 11/2005 |
| JP | 2007-307779 A | 11/2007 |

OTHER PUBLICATIONS

Microsoft Knowledge Base 202480, http://support.microsoft.com/kb/202480, Last Reviewed Jul. 16, 2004.*

* cited by examiner

*Primary Examiner* — Fred Guillermety
(74) *Attorney, Agent, or Firm* — Nutter McClennen & Fish LLP; John J. Penny, Jr.; Michael P. Visconti, III

(57) ABSTRACT

A printer includes: a print unit performing a printing operation; and a control unit having an operating system and a device driver installed in an operating system layer, a first application installed in an application layer other than the operating system layer so as to transmit and receive information to and from the print unit through the device driver, a transmission information acquiring module installed in the operating system layer so as to acquire transmission information which is information based on the information transmitted and received between the first application and the print unit through the device driver, and a second application installed in the application layer so as to receive the transmission information and to output processing information which is information based on the input transmission information.

5 Claims, 3 Drawing Sheets

PRINT CONTROLLER HAVING A FILTER DRIVER INSTALLED IN AN OPERATING SYSTEM LAYER AND A DATA OUTPUTTING APPLICATION INSTALLED IN AN APPLICATION LAYER

The entire disclosure of Japanese Patent Application No. 2008-073406, filed Mar. 21, 2008 is expressly incorporated by reference herein.

BACKGROUND

1. Technical Field

The present invention relates to a printer and an information managing system.

2. Related Art

A printer performing a process of adding a secondary color to monochromic printing data, which is prepared by a POS application program operating in an OS of a host having a computer system, by the use of an OPOS operating in the same OS and outputting the resultant data to a receipt printer was suggested in the past (for example, see JP-A-2003-260819).

In general, it is required that a printer can manage information on errors of the printer. In this case, it is desirable to manage such information without changing a POS application program installed already.

SUMMARY

An advantage of the invention is that it provides a printer and an information managing system capable of managing information based on information transmitted and received between an application and a print unit without changing the application installed already in an application layer.

The invention provides a printer and an information managing system having the following configurations.

According to an aspect of the invention, there is provided a printer including: a print unit performing a printing operation; and a control unit having an operating system and a device driver installed in an operating system layer, a first application installed in an application layer other than the operating system layer so as to transmit and receive information to and from the print unit through the device driver, a transmission information acquiring module installed in the operating system layer so as to acquire transmission information which is information based on the information transmitted and received between the first application and the print unit through the device driver, and a second application installed in the application layer so as to receive the transmission information and to output processing information which is information based on the input transmission information.

In the printer where the operating system and the device driver are installed in the operating system layer and the first application transmitting and receiving information to and from the print unit through the device driver is installed in an application layer other than the operating system layer, the transmission information acquiring module acquiring the transmission information which is information based on the information transmitted and received between the first application and the print unit through the device driver is installed in the operating system layer and the second application receiving the transmission information and outputting the processing information which is information based on the input transmission information is installed in the application layer. That is, the transmission information acquiring module is installed in the operating system layer other than the application layer in which the first application is installed. Accordingly, it is possible to output the processing information based on the transmission information without changing the first application. Since the control unit controls the second application to output the processing information to, for example, an external computer or to store the processing information in a memory unit (such as a hard disk), it is possible to manage the processing information. Here, the "transmission information" may be all or a part of the information transmitted and received between the first application and the print unit or may be information based on the information, such as the number of times when predetermined information is transmitted and received between the first application and the print unit. The "processing information" may be the transmission information itself, a part of the transmission information, or information based on the transmission information, such as the number of times when predetermined information is input.

In the printer, the print unit may output status information, which is information on a status of the print unit, to the first application and the transmission information may include the status information. Accordingly, it is possible to manage the status information or information based on the status information. Here, the "status information" includes information on an error of the print unit and amounts of consumed expendables (for example, ink when the print unit is an ink jet type) provided in the print unit.

In the printer, the first application may output printing information, which is information on the printing operation, to the print unit and the transmission information may include the printing information. Accordingly, it is possible to manage the printing information or information based on the printing information. Here, the "printing information" includes printing data.

According to an aspect of the invention, there is provided an information managing system including a plurality of printers described above and a computer transmitting and receiving the processing information to and from the plurality of printers, where each printer includes: a print unit performing a printing operation; and a control unit having an operating system and a device driver installed in an operating system layer, a first application installed in an application layer other than the operating system layer so as to transmit and receive information to and from the print unit through the device driver, a transmission information acquiring module installed in the operating system layer so as to acquire transmission information which is information based on the information transmitted and received between the first application and the print unit through the device driver, and a second application installed in the application layer so as to receive the transmission information and to output processing information which is information based on the input transmission information.

Since the information managing system includes the above-mentioned printer, it is possible to accomplish the advantage of the above-mentioned printer, for example, the same advantage as outputting the processing information based on the transmission information without changing the first application. Since the information managing system includes the computer, it is possible to manage the processing information output from the plural printers in a bundle by the use of the computer.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
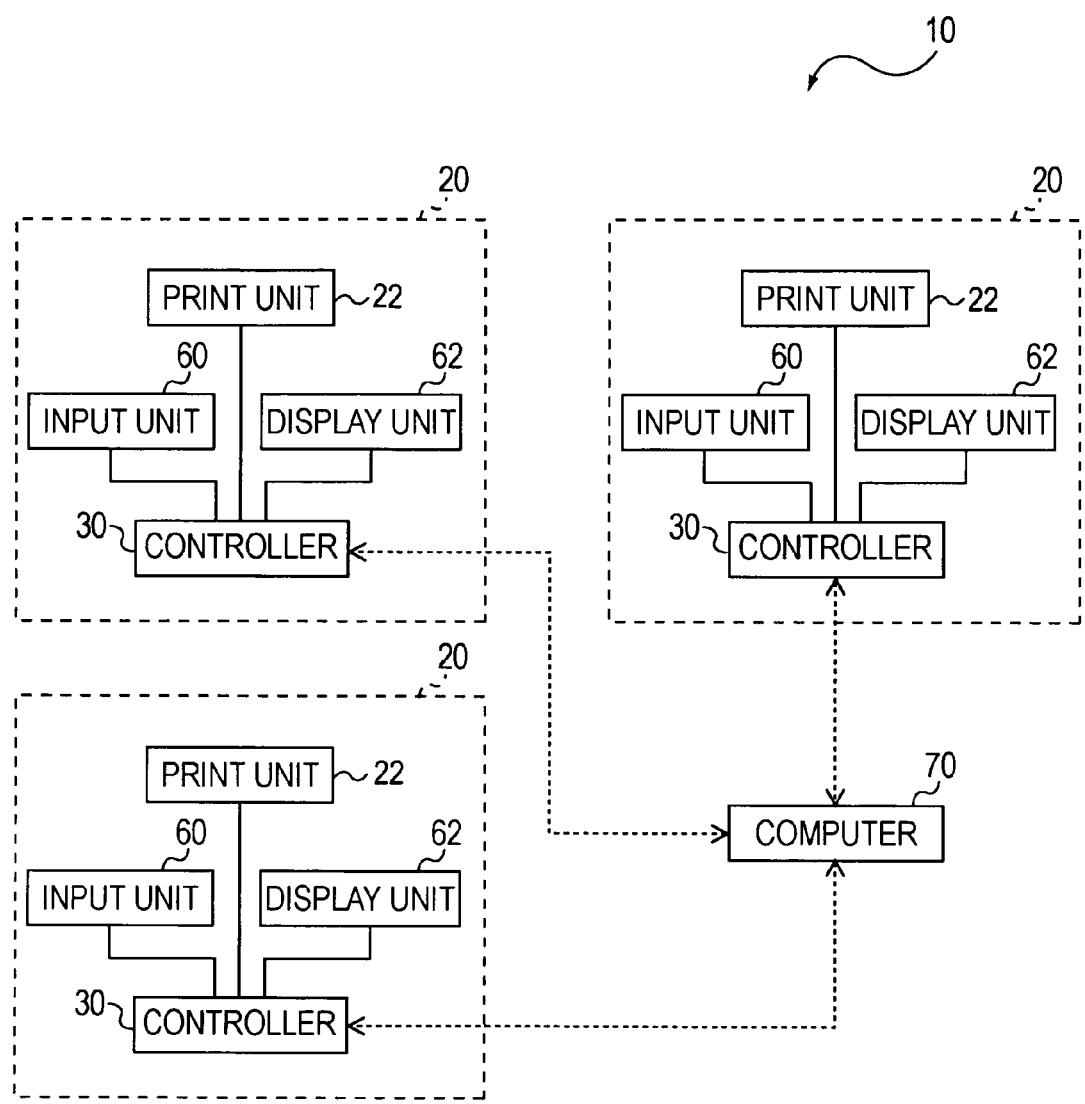
FIG. 1 is a diagram schematically illustrating a configuration of an information managing system according to an embodiment of the invention.
Figure 2:
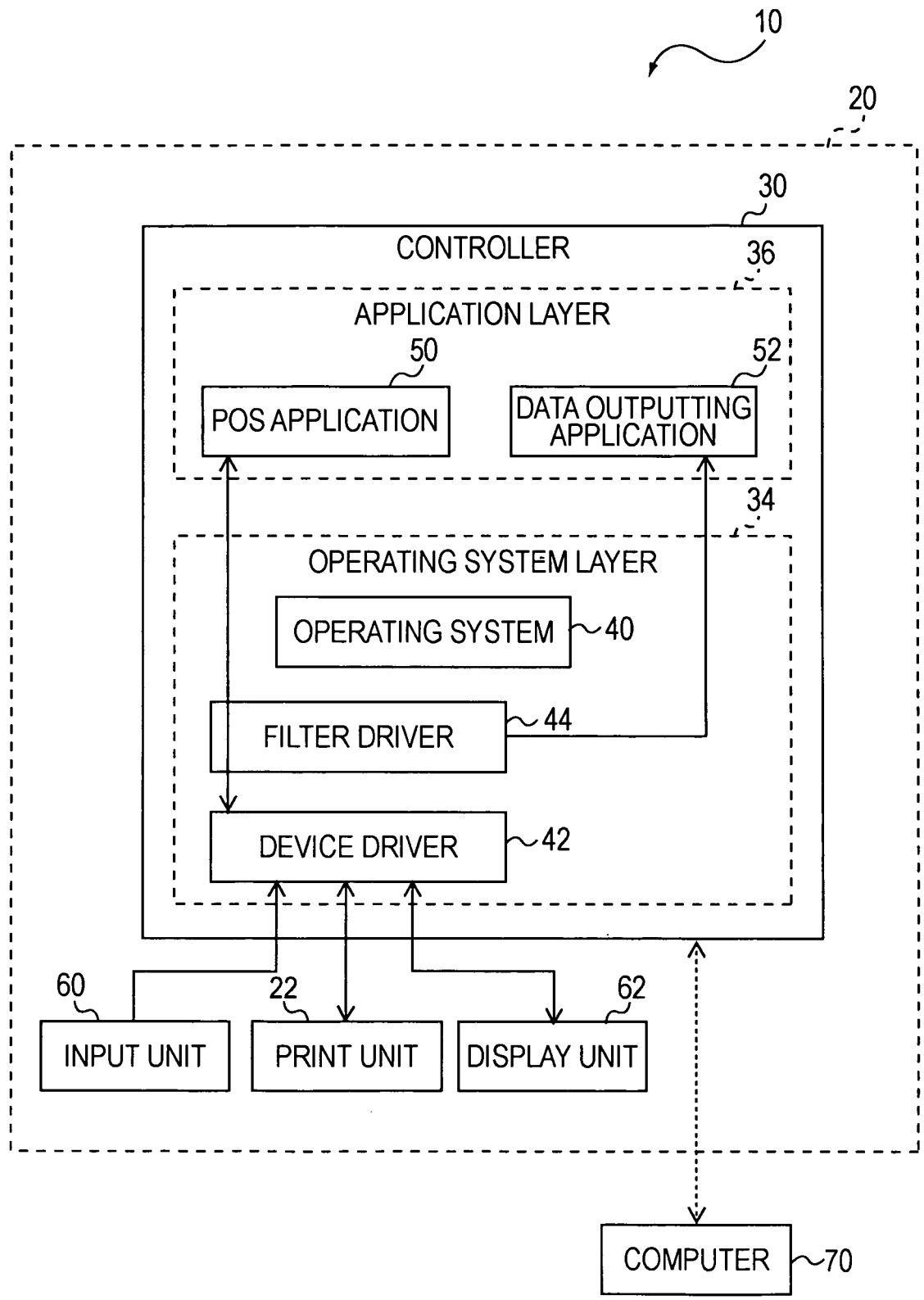
FIG. 2 is a diagram schematically illustrating a configuration of the information managing system.

Hereinafter, an exemplary embodiment of the invention will be described. FIGS. 1 and 2 are diagrams schematically illustrating a configuration of an information managing system 10 according to an embodiment of the invention. In FIG. 2, software layers of a controller 30 are shown. As shown in FIGS. 1 and 2, the information managing system 10 according to this embodiment includes plural printers 20 including a POS (Point of Sale) register used for a cash register disposed in a store and a computer 70 disposed in a back room so as to communicate with the printers 20 and to serve as a server managing data.

Each printer 20 includes a print unit 22 performing a printing operation on a receipt and the like, a controller 30 connected to the print unit 22 through a USB so as to communicate with the computer 70, an input unit (for example, a barcode reader) 60 inputting data to the controller 30, and a touch panel type display unit 62 displaying information processed by the controller 30 and inputting data to the controller 30.

The print unit 22 is of an ink jet type, receives printing data from a POS application 50 (described later) of the controller 30 through a device driver 42 (described later) to print a receipt and the like, and outputs data on the status of the print unit 22, for example, data on an error (hereinafter, referred to as "error data") or data on the amount of consumed ink (hereinafter, referred to as "ink consumption data"), to the POS application through the device driver 42.

The controller 30 is embodied by a computer including a CPU, a ROM, a RAM, and a hard disk not shown but well known and the software thereof is layered into plural layers including an operating system layer 34 and an application layer 36. An operating system 40 managing the entire operation of the controller 30, a device driver 42 enabling to use peripheral devices (the print unit 22, the input unit 60, and the display unit 62), that is, enabling to transmit and receive data between the controller 30 and the peripheral devices, and a filter driver 44 acquiring data are installed in the operating system layer 34. Various applications such as a POS application 50 associated with a printing operation of the print unit 22 and a data outputting application 52 outputting data to the computer 70 are installed in the application layer 36. In this embodiment, functions of the operating system layer 34 operate in a kernel mode of operation modes of the CPU and functions of the application layer 36 operate in a user mode of the operation modes of the CPU. Since the operating system 40 and the device driver 42 are not important to the invention, detailed description thereof is omitted.

The POS application 50 is an application outputting printing data, which is prepared on the basis of data input from the input unit 60 or the display unit 62, to the print unit 22 through the device driver 42 and inputting data (for example, error data or ink consumption data) on the status of the print unit 22 to the print unit 22 through the device driver 42.

The filter driver 44 is installed in the operating system layer 34 and is a driver acquiring the error data of the data (the printing data output from the POS application 50 to the print unit 22 or the error data or the ink consumption data output from the print unit 22 to the POS application 50) transmitted and received between the print unit 22 and the POS application 50 through the device driver 42 and outputting the error data to the data outputting application 52. In this embodiment, since the filter driver 44 is installed in the operating system layer 34, the filter driver 44 can be installed without changing the POS application 50 installed already therein at the time of installing the filter driver 44 in the controller not having the filter driver 44.

The data outputting application 52 is an application receiving the data output from the filter driver 44, outputting the data to the computer 70, and displaying the data on the display unit 62. The POS application 50 need not be changed at the time of installing the data outputting application 52 in the controller not having the data outputting application 52.

Figure 3:
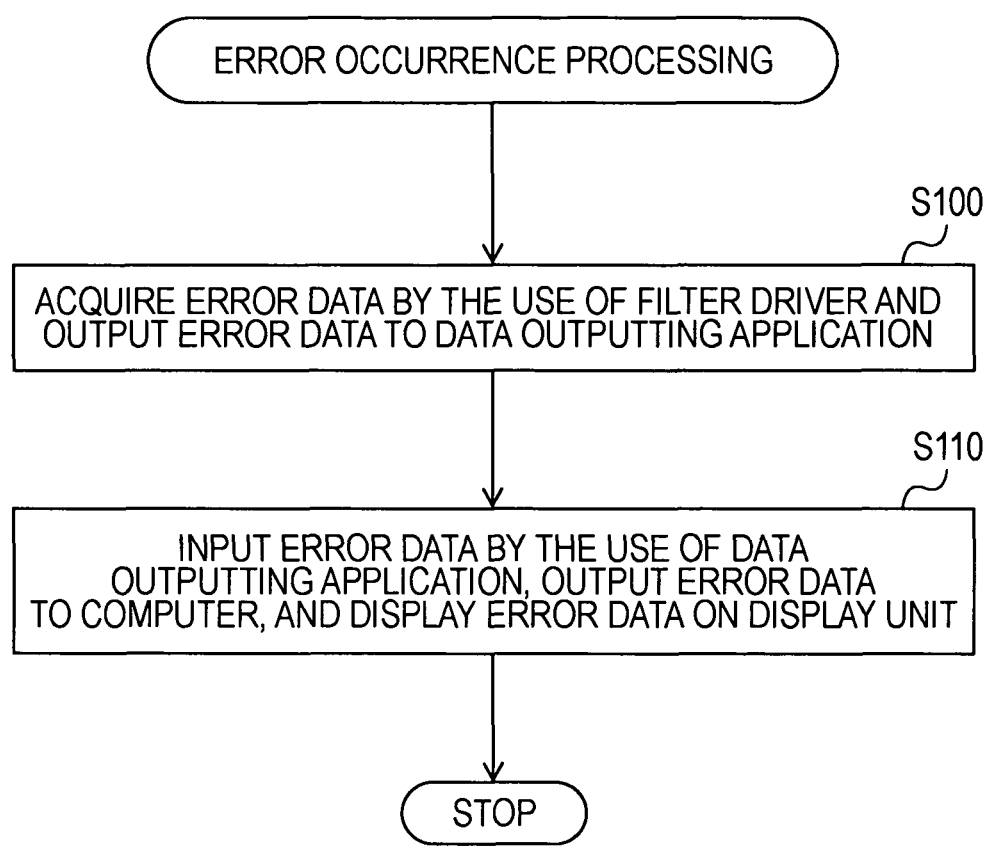
FIG. 3 is a flowchart illustrating an example of an error occurrence processing.

In the printer 20 according to this embodiment having the above-mentioned configuration, when data is input to the controller 30 from the input unit 60 or the display unit 62, the controller 30 controls the POS application 50 to output the printing data to the print unit 22 through the device driver 42 and the print unit 22 having received the printing data performs a printing operation on a receipt and the like. When an error occurs in the print unit 22, the error data is output to the POS application 50 from the print unit 22 through the device driver 42. At this time, the controller 30 controls the filter driver 44 to acquire the error data and to output the error data to the data outputting application 52 (S100) by the error occurrence processing shown in FIG. 3 and controls the data outputting application 52 having received the error data to output the error data to the computer 70 and to display the error data on the display unit 62 (S110). Accordingly, it is possible to collect and manage the error data by the use of the computer 70 and to cope with an error occurring in the print unit 22. Particularly, in this embodiment, since the information managing system 10 is considered which includes the plural printers 20 disposed in a store and the computer 70 disposed in the back room to communicate with the plural printers 20, it is possible to manage details or dates and times of the errors occurring in the printers 20 in a bundle by the use of the computer 70 by allowing the printers 20 to output the error data to the computer 70.

Here, the elements of this embodiment clearly correspond to the elements of the claims. That is, the print unit 22 of this embodiment corresponds to the "print unit" and the controller 30 corresponds to the "control unit".

In the printer 20 of the information managing system 10 according to this embodiment where the POS application 50 is installed in an application layer 36 other than the operating system layer 34 in which the operating system 40 and the device driver 42 are installed, since the filter driver 44 is installed in the operating system layer 34 and the data outputting application 52 is installed in the application layer 36, it is possible to install the filter driver 44 and the data outputting application 52 in the controller 30 without changing the POS application 50 installed already. When an error occurs in the print unit 22, the controller 30 controls the filter driver 44 to acquire the error data and controls the data outputting application 52 to output the error data to the computer 70, whereby it is possible to manage the error data by the use of the computer 70. Particularly, when plural printers 20 are provided, it is possible to manage the error data output from the plural printers 20 in a bundle by the use of the computer 70.

The invention is not limited to the above-mentioned embodiment, but can be modified in various forms belonging to the technical scope of the invention.

In this embodiment, the filter driver 44 acquires the error data of data (the printing data or the error data, the ink consumption data, or the like) transmitted and received between the print unit 22 and the POS application 50 through the device driver 42 and outputs the error data to the data outputting application 52. However, instead of or in addition to the error data, the filter driver 44 may acquire and output the printing data, the ink consumption data, or other data to the data outputting application 52. Here, an example of the other data can include the number of times when predetermined data (for example, error data) is transmitted and received between the POS application 50 and the print unit 22.

In this embodiment, the data outputting application 52 outputs the data input from the filter driver 44 to the computer 70 without any change. However, the data outputting application 52 may output only a part (for example, data on a predetermined error of the error data) of the data input from the filter driver 44 to the computer or may output data based on the data input from the filter driver 44, for example, the number of times when predetermined information (for example, error data) is input from the filter driver 44, to the computer 70.

In this embodiment, the data outputting application 52 outputs the data input from the filter driver 44 to the computer 70, but may store the data in the hard disk of the controller 30, instead or in addition.

In this embodiment, the print unit 22 employing an ink jet type, but may employ an electrophotographic type, a thermal transfer type, or a dot impact type.

In this embodiment, the information managing system 10 having the plural printers 20 and the computer 70 has been described, but the invention may be embodied in the form of a printer 20.

While the invention has been described with reference to the exemplary embodiment, the invention is not limited to the exemplary embodiment, but can be modified in various forms without departing from the gist of the invention.

The invention is applicable to the industry for manufacturing printers or information managing systems.

What is claimed is:

1. A printer comprising:
a print unit performing a printing operation; and
a control unit having
an operating system and a device driver installed in an operating system layer,
a first application installed in an application layer other than the operating system layer so as to transmit and receive information to and from the print unit through the device driver,
a transmission information acquiring module installed in the operating system layer so as to acquire transmission information which is based on the information transmitted and received between the first application and the print unit through the device driver, the transmission information comprising status information of the print unit transmitted to the first application from the print unit, and
a second application installed in the application layer so as to receive the status information included in the transmission information acquired by the transmission information acquiring module and to output processing information which is based on the status information,
wherein the transmission information acquiring module and the second application can be installed in the control unit without changing the first application.

2. The printer according to claim 1, wherein the status information is information on a status of the print unit.

3. The printer according to claim 1, wherein the first application outputs printing information, which is information on the printing operation, to the print unit, and wherein the transmission information includes the printing information.

4. An information managing system comprising a plurality of the printers according to claim 1 and a computer transmitting and receiving the processing information to and from the plurality of printers.

5. The printer according to claim 1, wherein the transmission information acquiring module comprises a filter driver installed in the operating system layer so as to acquire error data of the information transmitted and received between the print unit and the first application through the device driver and wherein the filter driver outputs the acquired error data to the second application.

* * * * *

UNITED STATES PATENT AND TRADEMARK OFFICE
CERTIFICATE OF CORRECTION

PATENT NO.        : 8,717,595 B2
APPLICATION NO.   : 12/383340
DATED             : May 6, 2014
INVENTOR(S)       : Takamoto et al.

Page 1 of 1

It is certified that error appears in the above-identified patent and that said Letters Patent is hereby corrected as shown below:

On the title page, item (75), change:

"Takashi Yamada"

to

"Takeshi Yamada"

Signed and Sealed this
Nineteenth Day of August, 2014

Michelle K. Lee
*Deputy Director of the United States Patent and Trademark Office*